United States Patent
Forman

(10) Patent No.: US 10,565,195 B2
(45) Date of Patent: Feb. 18, 2020

(54) RECORDS BASED ON BIT-SHIFTING

(71) Applicant: Hewlett-Packard Development Company, L.P., Houston, TX (US)

(72) Inventor: George Forman, Port Orchard, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 174 days.

(21) Appl. No.: 15/544,713

(22) PCT Filed: Feb. 3, 2015

(86) PCT No.: PCT/US2015/014300
§ 371 (c)(1),
(2) Date: Jul. 19, 2017

(87) PCT Pub. No.: WO2016/126239
PCT Pub. Date: Aug. 11, 2016

(65) Prior Publication Data
US 2018/0018366 A1    Jan. 18, 2018

(51) Int. Cl.
*G06F 17/30* (2006.01)
*G06F 16/2453* (2019.01)
(Continued)

(52) U.S. Cl.
CPC ...... *G06F 16/24534* (2019.01); *G06F 16/248* (2019.01); *G06F 16/24578* (2019.01)

(58) Field of Classification Search
CPC ......... G06F 16/24534; G06F 16/24578; G06F 16/248
See application file for complete search history.

(56) References Cited

U.S. PATENT DOCUMENTS

| 5,787,430 A | 7/1998 | Doeringer et al. |
| 6,614,789 B1 | 9/2003 | Yazdani et al. |

(Continued)

OTHER PUBLICATIONS

Bast, H. et al.; "Output-sensitive Auto completion Search"; Jul. 3, 2006 ; http://people.mpi-inf.mpg.de/~bast/papers/autocompletion-spire.pdf, 12 pages.

(Continued)

*Primary Examiner* — Apu M Mofiz
*Assistant Examiner* — Husam Turki Samara
(74) *Attorney, Agent, or Firm* — HP Inc. Patent Department

(57) ABSTRACT

Example implementations relate to records based on bit-shifting. For example, a computing device may include at least one processor to receive a query, create a normalized query, and generate a mapping of the normalized query for each record in a set of records in a database using a state array, the mapping being based on bit-shifting of bits associated with similarities between each character in the normalized query and each character in a field of the respective record in the set of records, each successive level of the state array indicating a stronger match between the query and the respective record than an immediately prior level in the state array. The processor may calculate a score associated with each record based on the respective mapping and may provide a subset of the set of records in response to the query based on the score associated with each record.

15 Claims, 3 Drawing Sheets

(51) Int. Cl.
*G06F 16/248* (2019.01)
*G06F 16/2457* (2019.01)

(56) References Cited

U.S. PATENT DOCUMENTS

| | | | |
|---|---|---|---|
| 7,155,427 | B1 | 12/2006 | Prothia et al. |
| 7,596,553 | B2 | 9/2009 | Meirovitz et al. |
| 7,809,744 | B2 | 10/2010 | Nevidomski et al. |
| 8,032,546 | B2 | 10/2011 | Arasu et al. |
| 8,140,462 | B2 | 3/2012 | Lambov |
| 8,463,810 | B1 | 6/2013 | Rennison |
| 8,631,035 | B2 | 1/2014 | Li et al. |
| 2007/0150604 | A1* | 6/2007 | Batteram ............ H04L 69/22 709/228 |
| 2008/0077570 | A1 | 3/2008 | Tang et al. |
| 2008/0319990 | A1 | 12/2008 | Aranenko et al. |
| 2011/0078152 | A1* | 3/2011 | Forman ............ G06F 17/277 707/747 |
| 2013/0097157 | A1 | 4/2013 | Ng et al. |
| 2015/0302236 | A1* | 10/2015 | Aspert ............ G06K 7/1443 235/462.09 |

OTHER PUBLICATIONS

Caron, E. et al; "Dynamic Prefix Tree for Service Discovery Within Large Scale Grids"; Sep. 6-8, 2006 ; http://ieeexplore.ieee.org/xpl/articleDetails.jsp?tp=&arnumber=1698600, Retrieved on 10 27 14 2 pages.

Li, Y. et al.; "A Two-dimensional Click Model for Query Auto-completion", Jul. 6-11, 2014, http://dl.acm.org/ft_gateway.cfm?id=2609571&ftid=1477556&dwn=1&CFID=463619371&C, 10 pages.

SaiKrishna, V. et al.; "String Matching and its Applications in Diversified Fields"; Jan. 2012 http://ijcsi.org/papers/IJCSI-9-1-1-219-226.pdf.

Wikipedia, "Bitap Algorith", Wikipedia, Retrieved on Jan. 12, 2018, 4 pages.

Wong, B. et al.; "Approximate Matching for Peer-to-peer Overlays with Cubit"; Oct. 2, 2009 , https://cs.uwaterloo.ca/~bernard/tr-cubit.pdf, 14 pages.

* cited by examiner

CUSTOMER INFORMATION

Company: anti square 3102

- ANTI-FREEZE CORPORATION; 123 MAIN STREET; SAN
- ABC MARKET; 432 ANTITHESIS SQUARE; SAN JOSE; C
- ANTICS; 90 GOLCHA SQUARE; OAKLAND; CALIFORNIA
- ANTARCTIC PRODUCTS; 310 2ND AVENUE; PALO ALTO
- ANT INCORPORATED; 32 UNION SQUARE; MENLO PARK
- FRANTIC PARTY SUPPLY; 102 MARKET STREET; SQUAW

Street:
City:
State:
Postal Code:
Country:

*FIG. 1*

RECORDS BASED ON BIT-SHIFTING

BACKGROUND

Many entities (e.g., enterprises, organizations, computer applications, etc.) utilize databases for storage of data relating to the entities. For example, a business may maintain a database of customer information, and the customer information may be accessed by querying the database. Data stored in these databases may be accessed and updated for various purposes.

BRIEF DESCRIPTION OF THE DRAWINGS

Some examples of the present application are described with respect to the following figures:

FIG. 1 is an interface diagram of an example user interface for accessing database records based on bit-shifting;

DETAILED DESCRIPTION

Figure 2:
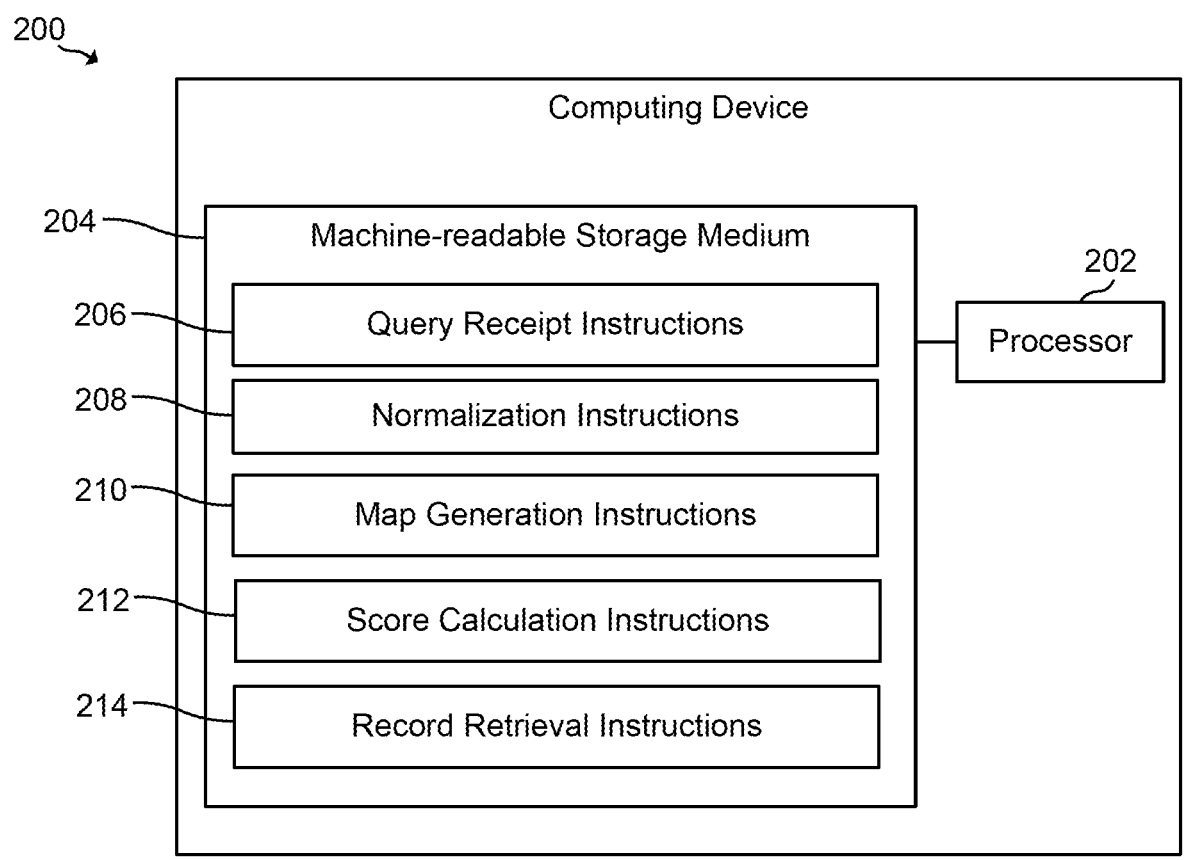
FIG. 2 is a block diagram of a computing device for providing database records based on bit-shifting.

As described above, data stored in a database may be accessed and updated for various purposes. For example, a company may receive phone calls from customers for various reasons (e.g., new orders from customers, service-related calls from customers, etc.), and information associated with the customer may be entered in the company's database. However, in some examples, the customer may already have an existing database record in the company's database, and entering the customer's information as a new record may be redundant.

The technology disclosed herein allows an employee of a company to efficiently access existing records associated with customers. When a user begins entering customer information into a form, information associated with relevant existing customer records may be provided to the user such that the user may select a relevant record to automatically populate the form. The relevant records provided to the user may be based on the information entered by the user and may account for misspellings (e.g., dropped letters, insertions, replacements, transpositions, etc.), superfluous words, abbreviations, related words and/or phrase, aliases, acronyms, synonyms and/or equivalent terms, foreign languages, and the like, that may be associated with the information provided by the user. For example, if a user begins entering information for Customer A and a record associated with Customer A currently exists in the database, the user may select the Customer A record from a list of records provided to the user, where the list of records provided may include records that may be relevant to the information that the user has entered into the form. The list of records provided may be updated as the user types based on the relevancy of records with respect to the user input. In some examples, the list of records provided may account for one or more words that may be in the same field and/or different fields of the form.

When a user begins typing characters into a particular field of a form on a user interface, the query is received and normalized such that the characters of the query are transformed to a standardized format. For example, a character "Ä" in a query may be normalized to the character "a". A mapping of the normalized query is generated for each record in a set of records in a database. The mapping is based on bit-shifting bits associated with similarities between each character in the normalized query and each character in a field of the respective record in the set of records, as described in more detail below. A score associated with each record is calculated based on the respective mapping, and the score is used to provide a subset of the set of records to the user in response to the query. For example, records within the set of records having higher scores may be provided to the user in response to the query.

Each record $R_i$ in a database may consist of a list of one or more fields (e.g., name, street, city, state, postal code, country, etc.). In some examples, the fields associated with a record may allow for synonym extensions to enable searching for a record based on synonyms for terms specified in the record. For example, if a company name has synonyms that include a pre-merger company name, the synonym extension may allow users to search for the company record using either name, as the record may include additional fields for synonyms like the pre-merger company name. Likewise, if the state field has an abbreviation alternative, it may be added as an additional field (e.g. "Alaska" and "AK").

A query may be normalized in any suitable manner such that the query may be standardized and compared with a normalized record. Examples of normalizations of queries and records include mapping characters to uppercase or lowercase (e.g., "A" →"a"), mapping accented characters to their unaccented version (e.g. Ü→U), mapping '&,' '+,' 'and,' or 'und' to '&' to accommodate for name variations entered in the database record such as "C and J's Plumbing", "C&J Plumbing", or "C+J Plumbing," mapping other punctuation to a space character (e.g., ","→" "), ensuring that multiple interior space characters are reduced to a single space, ensuring that a query string begins and ends with a single space character such that a query such as "IT" matches to the word "IT" in a record with a higher score than matching as a prefix to a word such as "Itanium" or to the interior of a word such as "Invitations," and the like. Queries and/or records may be normalized by leveraging an array that maps an input character to an output character. Records may be normalized in advance of comparing a record to a query or on-the-fly after a query is received.

In some examples, when database fields are normalized, a space character may be inserted before and after a sequence of digit characters if the digit characters are immediately preceded and/or followed by foreign language ideograph characters (e.g., Chinese characters, Japanese characters, Korean characters, etc.). For example, a database field that includes "浦东新区春轶路 23 号" may have space characters inserted before and after "23" such that a query having "23" may match the number "23" in the record with a higher score than records that only have this particular sequence of digits buried within a longer number, such as "浦东新区春轶路 1230 号."

In some examples, a query may consist of sixty-four characters or less, and thus, without loss of generality, the techniques described herein use examples of 64-bit long numbers. However, one having ordinary skill in the art will appreciate that longer queries may be processed similarly and/or by using additional processing, such as being divided and handled in pieces, being handled by providing a longer bit-wise representation, and the like. The techniques disclosed herein are described with the convention that the least-significant bit corresponds to the character at the beginning of a query, and thus a left-shift operator (e.g., <<) may advance each bit to the next position in the query string.

Once a query has been received and normalized, a mapping that maps each character ch of the normalized query to all the bit positions that the character occupies may be generated. The mapped entry for a non-occurring character may return zero, indicating that the bit position is not enabled. In some examples, a long [ ] charmasks array may be used to quickly access the bit positions via a simple lookup charmasks [ch].

A score may be calculated for each record $R_i$, where a score may indicate the degree to which a record corresponds to the received query. The scores for each record $R_i$ may be calculated either sequentially or in parallel on multiple central processing unit (CPU) cores independently. To calculate a score of a record, an accumulator array of query-.length long words may be allocated to the record (e.g., accumulator:=new long [qlen]). Each position within a long may correspond to a position within the query string, and each successive array slot may correspond to more characters matched between the query and the record. The accumulator may record the higher matches over all text fields and over all positions within a field string. This may be considered as a high water mark for the state array S, which is described below. In some examples, the accumulator and state arrays may be shorter (e.g., qlen=the length of the longest term or phrase, including prefix and suffix spaces, that one may wish to be able to detect whole).

A state array S of query.length longs initially set to zero may be allocated for each field F of the record R (e.g., S:=new long [qlen]), similar to the accumulator. Bits may be copied to successive array positions at successive bit positions when the next character in the query matches, and bits may be copied to antecedent array positions when a matching error is encountered, such as a character substitution (e.g., where the query and text disagree and each character forward is skipped), a query character deletion (e.g., the text character is skipped and the matching is continued from the same position), a query character insertion (e.g., the query character is skipped and matched at the following position), and the like.

For each character ch of field F, the character bit positions may be looked up from the mapping generated after receipt and normalization of the query (e.g., mask:=charmasks [ch]), and a new state array S' may be computed. Since the new state array S' is an array of longs, the computation is iterated over each index position. For each q=0 . . . qlen−1, the new state array S' is computed as follows:
  long more:=S[q+1], else 0 if q+1 is past the end of the array
  long same:=S[q]
  long less:=S[q−1], else −1 (all 1 bits) if q=0
  long enabled=(less|(same<<1))<<1, else −1 (all bits 1) if q=0, where the all-bits-enabled when q=0 is what allows the algorithm to begin a match at any character position at each step. The inclusion of "same<<1" corresponds to a query deletion (e.g., −1 array position) followed by a query match (e.g., +1 array position).
  S'[q]:=(mask & enabled)|more|(more<<1). Here, a bit is set to 1 at array position q if and only if the current character appears at a position right after a previously enabled position for position q−1 matched (e.g., mask & enabled), or if and only if this position had a match for q+1 matched characters (e.g., more), or if and only if the previous position had a match for q+1 (e.g., more<<1).
  accumulator[q]=accumulator[q]|S'[q]. This keeps track of the highest array position enabled for each bit position.

Optionally, if phrases between multiple words are not tracked, the bits in space positions for all q>0 are zeroed out. In this case, qlen need only be the length of the longest query term (e.g., if (q>0) S'[q] &=~charmasks[' ']; where ~ is bitwise inversion).

Once the new state array S' is computed, state array S is set to new state array S'. This may be implemented with a pointer swap, and the old allocated array may be used for S' the next time.

Once all the fields in a record have been processed, the accumulator bits may be processed to compute the score for the record, where the initial score for each record may begin at a particular score (e.g., initial score of 0.0). For each query term end position i (e.g., each bit position corresponding to a space character, except the first), the maximum q value (e.g., qmax) is determined, where accumulator[q] bit i is set or bit i−1 is set. This may find the maximum number of characters matching by the end of the term, with or without the final space. The credit for this term may then be computed. This may be done in a number of variations. The approximate percentage of matched characters may be computed (e.g., qmax divided by the length of the term including the space character on both ends). In some examples, the credit (e.g., in range from 0.0 to 1.0) may be squared to further penalize weak matches. If the optional step of zeroing out bits for phrases that are not tracked is not included, then the scoring of phrases may be handled by considering them worth more than their constituent terms alone. If qmax is greater than the current term length, then the database had text that covered a phrase of terms. In this case, the term length of the phrase is extended to cover additional previous terms until it is greater than or equal to qmax. The phrase credit is then qmax divided by the phrase length with 1.0 being a perfect match of the phrase including spaces on the ends, increased by a bonus for covering the phrase. There are a variety of ways to do this, such as increasing the phrase credit by an additional amount or percentage (e.g., +0.1, 25%, etc.) optionally increased for each term in the phrase. The score may then be calculated by adding the score and the credit, and the score may be returned for the entire record.

A subset of the records for which scores were determined may be presented to the user based on the scores for each record. For example, the ten highest-scoring records may be presented to the user in any suitable manner (e.g., as an auto-completion result, as a list of search hits, etc.).

In some examples, if there are too many records to search within the desired user-interactive latency bound, then a pre-filtering stage may be added to quickly select a subset of records on which to perform the bit-shift algorithm described above. The pre-filter may be a simple index of the set of n-grams of adjacent characters that occurs in the record anywhere (e.g., 3-grams, 2-grams, 1-grams, etc.). For example, when the query arrives, a set of 1- through 3-grams it contains may be produced, and the reverse indices may be used to tally how many of these n-grams are contained in each record. An array of numbers may be used to tally the count. A portion of the array (e.g., the 25,000 largest values in the array) may be used as candidate records for which to run through the bit-shift algorithm.

Referring now to the figures, FIG. 1 is an interface diagram of an example user interface 100 for accessing database records based on bit-shifting. User interface 100 may be used to enter customer information into a database. A user may enter information into the various fields of user interface 100 (e.g., company name, street, city, state, postal code, country, etc.). For example, a user may enter a query "anti square 3102" in the company name field 102. As the user types the information into field 102, drop-down menu 104 may appear, displaying existing records that may be relevant to the user's entry in field 102, where the relevant records are identified using a mapping generated based on bit-shifting of bits associated with similarities between each character in the query and each character in a field of a record. For example, if a user begins typing customer information into field 102 for a particular customer, the user may use drop-down menu 104 to determine that the particular customer already has a relevant record in the database, and the user may select the relevant record entry (e.g., record entry 106) to automatically populate the fields in user interface 100, which may increase the accuracy and speed at which a user may find and enter customer information.

In some examples, a user may begin typing information in any field of user interface 100, and user interface 100 may display relevant records based on the typed information being relevant to any field of user interface 100. For example, a user may begin typing "anti square 3102" in field 102, and drop-down menu 104 may display records that contain similar text in any field of any record. As shown in the example of FIG. 1, drop-down menu 104 may display a record having "anti," or a word similar to or a variation of "anti," in the company name field 102 (e.g., Anti-Freeze Corporation, Antics, Antarctic Products, Ant Incorporated, Frantic Party Supply), street field (e.g., 432 Antithesis Square), city field, state field, postal code field, and/or country field.

In some examples, as the user types information into any field, the relevant records displayed in drop-down menu 104 may be updated based on newly typed information. For example, after the user types "anti" in field 102, drop-down menu 104 may display records relevant to "anti." When the user types additional information in field 102, such as "square," drop-down menu 104 may be updated with records relevant to the information typed in field 102 (e.g., "anti square" may retrieve some records that include "square" in the street field). A user may type into any field each portion of text to help distinguish the sought record, rather than having to carefully type each portion into the appropriate field. This may be helpful in cases where some database entries have data fields mixed up (e.g. the state and the city field swapped in the stored record).

FIG. 2 is a block diagram of an example computing device 200 for providing database records based on bit-shifting. Computing device 200 may receive a query, and in response, a subset of records in a database may be provided using a mapping generated based on bit-shifting of bits associated with similarities between each character in the query and each character in a field of each record.

Computing device 200 may be, for example, a web-based server, a local area network server, a cloud-based server, a notebook computer, a desktop computer, an all-in-one system, a tablet computing device, a mobile phone, an electronic book reader, a printing device, or any other electronic device suitable for providing database records based on bit-shifting. Computing device 200 may include a processor 202 and a machine-readable storage medium 204. Computing device 200 may use a mapping generated based on bit-shifting of bits associated with similarities between each character in a query and each character in a field of a particular record in a database to provide a subset of records in response to the query.

Processor 202 is a tangible hardware component that may be a central processing unit (CPU), a semiconductor-based microprocessor, and/or other hardware devices suitable for retrieval and execution of instructions stored in machine-readable storage medium 204. Processor 202 may fetch, decode, and execute instructions 206, 208, 210, 212, and 214 to control a process of providing database records based on bit-shifting. As an alternative or in addition to retrieving and executing instructions, processor 202 may include at least one electronic circuit that includes electronic components for performing the functionality of instructions 206, 208, 210, 212, 214, or a combination thereof.

Machine-readable storage medium 204 may be any electronic, magnetic, optical, or other physical storage device that contains or stores executable instructions. Thus, machine-readable storage medium 204 may be, for example, Random Access Memory (RAM), an Electrically Erasable Programmable Read-Only Memory (EEPROM), a storage device, an optical disc, and the like. In some examples, machine-readable storage medium 204 may be a non-transitory storage medium, where the term "non-transitory" does not encompass transitory propagating signals. As described in detail below, machine-readable storage medium 204 may be encoded with a series of processor executable instructions 206, 208, 210, 212, and 214 for receiving a query; creating a normalized query that is a normalized version of the query; generating a mapping of the normalized query for each record in a set of records in a database using a state array, the mapping being based on bit-shifting of bits associated with similarities between each character in the normalized query and each character in a field of the respective record in the set of records, each successive level of the state array indicating a stronger match between the query and the respective record than an immediately prior level in the state array; calculating a score associated with each record based on the respective mapping; and providing a subset of the set of records in response to the query based on the score associated with each record in the subset of records.

Query receipt instructions 206 may manage and control receipt of queries from users, including managing and controlling the receipt of characters in the queries. For example, query receipt instructions 206 may receive one or more characters in a query inputted into a field in user interface 100 of FIG. 1.

Normalization instructions 208 may manage and control the normalization of a query. For example, normalization instructions 208 may normalize the received query such that each character of the query is transformed into a standardized format (e.g., normalizing "Ã" to "a"), creating a normalized query that is a normalized version of the query. In some examples, normalization instructions 208 may also normalize each record in a set of records in a database into a normalized record. For example, normalization instructions 208 may normalize a set of pre-filtered records to create a set of normalized pre-filtered records.

Map generation instructions 210 may manage and control the generation and/or creation of a mapping of the normalized query for each record in a set of records in a database using a state array. The mapping may be generated and/or created based on bit-shifting of bits associated with similarities between each character in the normalized query and each character in a field of the respective normalized record in the set of records. In some examples, the mapping may be generated using a state array, where each successive level of the state array indicates a stronger match between the query and the respective record than an immediately prior level in the state array. In some examples, the mapping may be generated based on an enabled bit associated with a query character being shifted if the query character is similar to a corresponding record character. In some examples, the enabled bit is not shifted if a subsequent query character is different than a corresponding record character.

Score calculation instructions 212 may manage and control the determination and/or calculation of a score associated with each record based on the respective mapping for that record. For example, a particular record may be scored based on the mapping generated based on bit-shifting of bits (e.g., based on the similarities between each character in the normalized query and each character in a field of the respective normalized record). In some examples, the scores associated with each record may be tracked using an accumulator array.

Record retrieval instructions 214 may manage and control the retrieval and the providing and/or displaying of a subset of the set of records in response to the query. The subset of records may be retrieved and provided and/or displayed based on the score associated with each record in the subset of records. In some examples, the subset of records may be records having scores within a particular range with respect to scores of other records in the set of records (e.g., providing records that have a score within the top 10% of scores for the set of records). In some examples, the subset of records may be displayed in an order that is based on the scores of each record (e.g., the higher scoring records being displayed at the top of the list of records provided).

Figure 3:
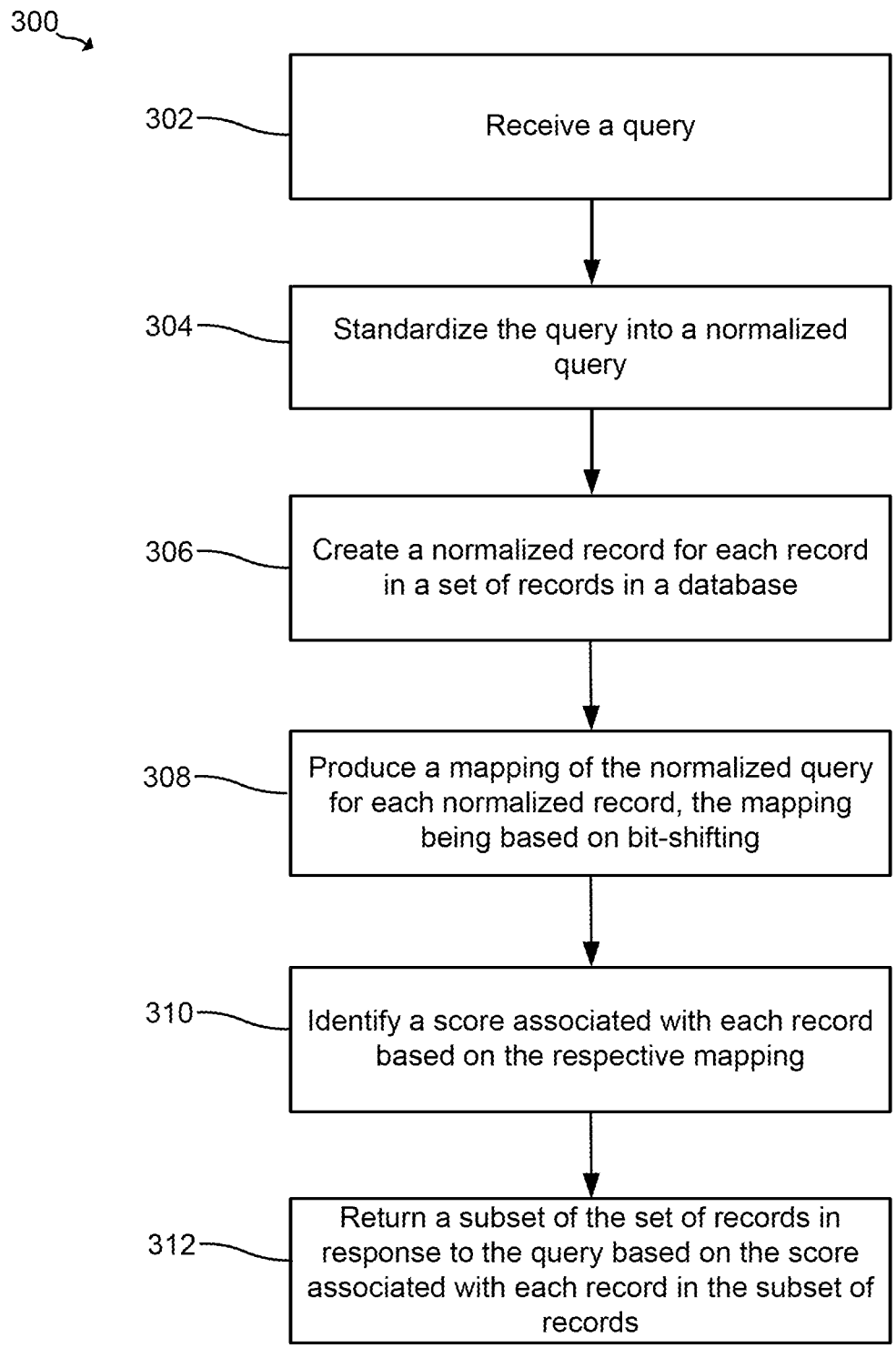
FIG. 3 is a flowchart illustrating an example method of returning database records based on bit-shifting.

FIG. 3 is a flowchart illustrating an example method 300 of returning database records based on bit-shifting. Method 300 may be implemented using computing device 200 of FIG. 2.

Method 300 includes, at 302, receiving a query. For example, in FIG. 1, the query "anti square 3102" in field 102 may be received via user interface 100.

Method 300 also includes, at 304, standardizing the query into a normalized query. For example, a query containing capital letters, accented letters, punctuation, and the like may be standardized to a normalized query.

Method 300 also includes, at 306, creating a normalized record for each record in a set of records in a database. For example, a record in a database may be normalized to create a normalized record by removing additional elements of each character in the record, such as capital letters, accented letters, punctuation, and the like.

Method 300 also includes, at 308, producing a mapping of the normalized query for each normalized record using a state array. The mapping may be based on bit-shifting of bits associated with similarities between each character in the normalized query and each character in a field of the respective normalized record. In some examples, the mapping may be produced using a state array, where each successive level of the state array indicates a stronger match between the query and the respective normalized record than an immediately prior level in the state array.

Method 300 also includes, at 310, identifying a score associated with each record based on the respective mapping. In some examples the score for each record may be tracked using an accumulator array.

Method 300 also includes, at 312, returning a subset of the set of records in response to the query based on the score associated with each record in the subset of records. In some examples, the subset of records may include records that fall within a particular range of scores associated with records in the database. In some examples, the subset of records may be returned in an order that is based on the score associated with each record.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. A computing device comprising:
a processor to:
receive a query;
create a normalized query, the normalized query being a normalized version of the query;
generate a mapping of the normalized query for each record in a set of records in a database using a first state array, wherein each record in the set of records includes a plurality of fields each having characters to be processed and the mapping is based on bit-shifting of bits associated with similarities between each character in the normalized query and each character in the plurality of fields included in each respective record;
generate a second state array based on the mapping of each character of the plurality of fields included in each respective record;
calculate a score associated with each record based on the respective mapping, wherein the score is higher for the mapping of the second state array than the mapping of the first state array inciting a stronger match between the query and each respective record of the second state array than the first state array;
track the score associated with each record using an accumulator array, wherein:
a position of the bits associated with similarities between each character in the normalized query is tracked; and
non-occurring characters in space positions include a zero and the accumulator array refrains from tracking the non-occurring characters; and
provide a subset of the set of records in response to the query based on the score associated with each record in the subset of records.

2. The computing device of claim 1, wherein the at least one processor is further to pre-filter records in the database based on the query, the set of records being based on the pre-filtering.

3. The computing device of claim 1, wherein the subset of records includes records having scores within a particular range with respect to scores of other records in the set of records.

4. The computing device of claim 1, wherein the mapping is generated based on an enabled bit associated with a query character being shifted if the query character is similar to a corresponding record character.

5. The computing device of claim 1, wherein an array length of the first state array is based on a query length of the query.

6. The computing device of claim 1, wherein the accumulator array includes the zero associated with each space character in the field of the respective record.

7. A method comprising:
receiving a query;
standardizing the query into a normalized query;
creating a normalized record for each record in a set of records in a database;
producing a mapping of the normalized query for each normalized record using a first state array, wherein each record in the set of records includes a plurality of fields each having characters to be processed and the mapping is based on bit-shifting of bits associated with similarities between each character in the normalized query and each character in the plurality of fields included in each respective normalized record;
generating a second state array based on the mapping of each character of the plurality of fields included in each respective normalized record;
identifying a score associated with each record based on the respective mapping, wherein the score is higher for the mapping of the second state array than the mapping of the first state array inciting a stronger match between the query and each respective normalized record of the second state array than the first state array;
tracking the score associated with each record using an accumulator array, wherein:
a position of the bits associated with similarities between each character in the normalized query is tracked; and
non-occurring characters in space positions include a zero and the accumulator array refrains from tracking the non-occurring characters; and
returning a subset of the set of records in response to the query based on the score associated with each record in the subset of records.

8. The method of claim 7, further comprising:
pre-filtering records in the database based on the query, the set of records being based on the pre-filtering.

9. The method of claim 7, wherein an array length of the first state array is based on a query length of the query.

10. The method of claim 7, wherein the mapping is produced based on an enabled bit associated with a query character being shifted if the query character is similar to a corresponding record character.

11. A non-transitory machine-readable storage medium storing instructions that, if executed by a processor of a computing device, cause the computing device to:
receive a query;
normalize the query into a normalized query;
normalize each record in a set of records in a database into a normalized record;
create a mapping of the normalized query for each normalized record using a first state array, wherein each record in the set of records includes a plurality of fields each having characters to be processed and the mapping is based on bit-shifting of bits associated with similarities between each character in the normalized query and each character in the plurality of fields included in each respective normalized record;
generate a second state array based on the mapping of each character of the plurality of fields included in each respective record;
determine a score associated with each record based on the respective mapping, wherein the score is higher for the mapping of the second state array than the mapping of the first state array inciting a stronger match between the query and each respective normalized record of the second state array than the first state array;
track the score associated with each record using an accumulator array, wherein:
a position of the bits associated with similarities between each character in the normalized query is tracked; and
non-occurring characters in space positions include a zero and the accumulator array refrains from tracking the non-occurring characters; and
display a subset of the set of records in response to the query based on the score associated with each record in the subset of records.

12. The non-transitory machine-readable storage medium of claim 11, wherein the instructions further cause the computing device to:
pre-filter records in the database based on the query, the set of records being based on the pre-filtering.

13. The non-transitory machine-readable storage medium of claim 11, wherein an array length of the first state array is based on a query length of the query.

14. The non-transitory machine-readable storage medium of claim 11, wherein the mapping is created based on an enabled bit associated with a query character being shifted if the query character is similar to a corresponding record character.

15. The non-transitory machine-readable storage medium of claim 11, wherein the accumulator array includes the zero associated with each space character in the field of the respective record.

* * * * *